United States Patent [19]

Wilson

[11] Patent Number: 5,437,122

[45] Date of Patent: Aug. 1, 1995

[54] FISHING ROD HOLDER

[76] Inventor: Darrell E. Wilson, 3576 Wood Ave., Eugene, Oreg. 97402

[21] Appl. No.: 231,511

[22] Filed: Apr. 22, 1994

[51] Int. Cl.⁶ .......................................... A01K 97/10
[52] U.S. Cl. ................................................ 43/21.2
[58] Field of Search .............. 43/21.2; 248/514, 515, 248/534, 536, 538

[56] References Cited

U.S. PATENT DOCUMENTS

| | | | |
|---|---|---|---|
| 1,520,543 | 12/1924 | Meachen | 43/21.2 |
| 2,995,855 | 8/1961 | Bell | 43/21.2 |
| 3,964,706 | 6/1976 | Adams | 43/21.2 |
| 4,198,775 | 4/1980 | Leisner | 43/21.2 |
| 4,407,089 | 10/1983 | Miller | 43/21.2 |
| 5,184,797 | 2/1993 | Hurner | 43/21.2 |

*Primary Examiner*—Kurt Rowan
*Attorney, Agent, or Firm*—James D. Givnan, Jr.

[57] ABSTRACT

The holder includes an elongate tubular member open at one end for the insertion of a fishing rod. A set of lengthwise extending edges define an open area to receive a fishing reel in place on the fishing rod handle. A second set of lengthwise edges are offset rotationally from the first mentioned edges and define an area in which the reel is received when the rod is seated in place in the holder. A third set of edges define an open area communicating the first and second open areas. A mount for the holder includes a bracket. A modified mount includes a cylindrical member for installation in a previously installed prior art rod holder.

7 Claims, 1 Drawing Sheet

U.S. Patent   Aug. 1, 1995   5,437,122
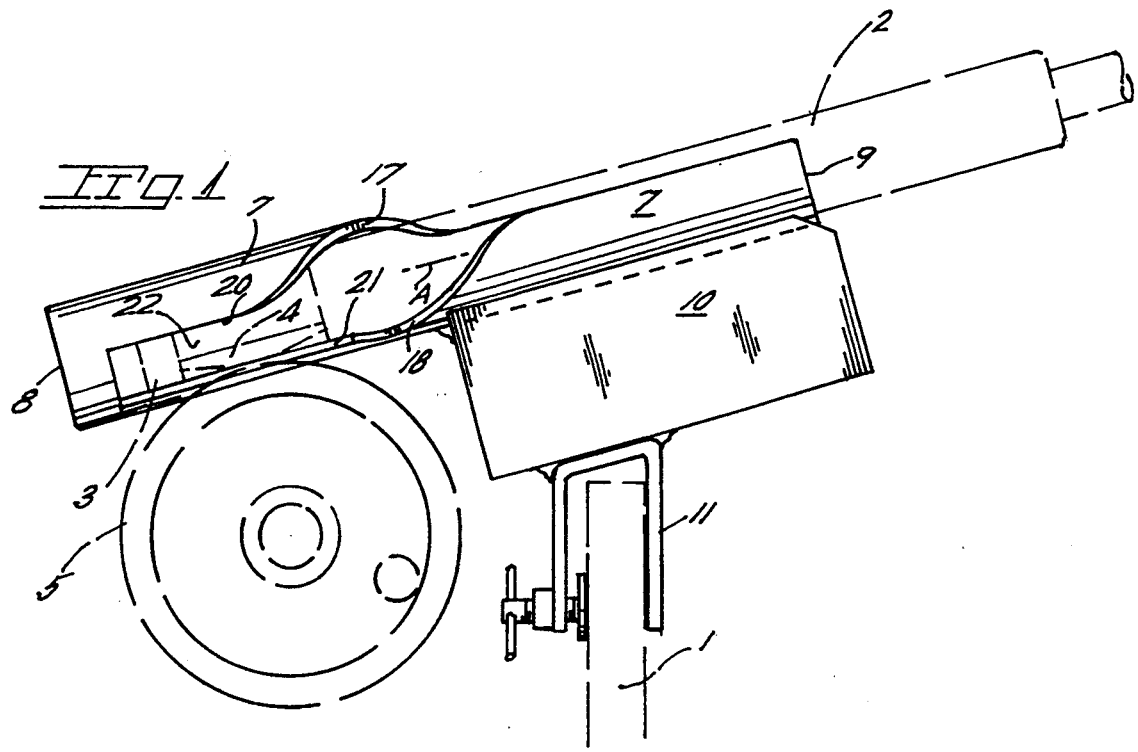
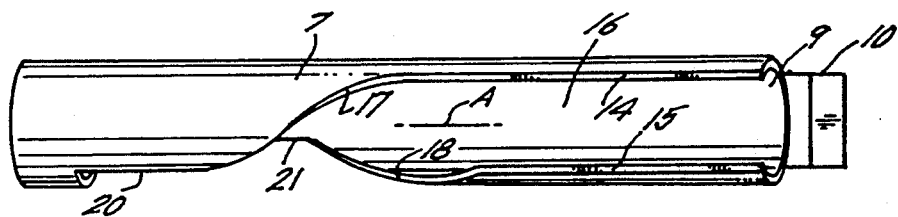
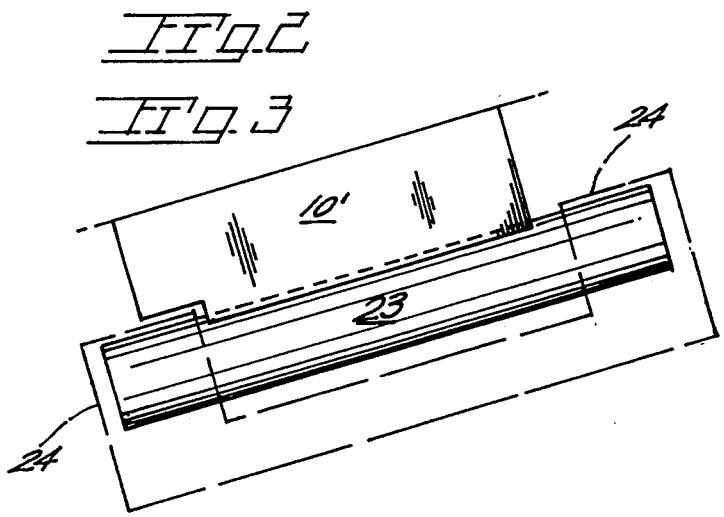

FISHING ROD HOLDER

BACKGROUND OF THE INVENTION

The present invention pertains generally to holders or fishing rods for supporting the rod during use.

Typically fishing rod holders are of tubular construction and of a length to receive the inserted end of a fishing rod handle. The holder, in use, is upwardly inclined to assure retention of the rod against accidental rod dislodgment. Typically holders include mounting means for attachment of the holder to a boat gunwale, dock, etc. Such tubular rod holders make no provision for rotational reception of a reel on the rod handle.

U.S. Pat. Nos. 2,287,641 and 3,802,652 disclose rod holders having oppositely facing, semi-circular brackets in which a pole handle is seated. U.S. Pat. No. 4,637,156 discloses a tubular rod holder utilizing a leaf spring lock which extends into the holder to engage a rod handle.

SUMMARY OF THE PRESENT INVENTION

The present invention is embodied within a fishing rod holder shaped so as to receive a portion of a reel affixed to the rod handle.

The present rod holder is of generally tubular configuration, having multiple communicating open areas spaced therealong. The open areas of the holder permit insertion of a fishing reel attached to a handle of a fish rod with insertion of a reel base taking place upon axial and rotational movement of the rod handle. Accordingly, the rod handle so installed is confined in place against accidental dislodgement yet permits rapid removal of the rod upon a fish being hooked.

Important objectives of the present rod holder include a holder wherein a fishing rod and attached reel are retained in place against accidental dislodgement by contact of a reel base with the holder to avoid steep inclined angle of the holder; the provision of a rod holder having contiguous edge structure defining open areas in the tubular wall of the holder, some of which have a rotational component to define open areas offset from one another about the major axis of the rod holder; the provision of a rod holder which requires both axial and rotational movement of a rod handle during installation and removal from the present holder.

BRIEF DESCRIPTION OF THE DRAWINGS

In the drawings:

FIG. 1 is a side elevational view of the present holder with a fishing rod and attached reel shown in phantom lines; and FIG. 2 is a plan view of FIG. 1 with the rod and reel removed.

FIG. 3 is a view of a modified form of the invention.

DETAILED DESCRIPTION OF THE PREFERRED EMBODIMENTS

With continuing attention to the drawings, wherein applied reference numerals indicate parts similarly hereinafter identified, the reference numeral 1 indicates a support for the present rod holder, which may be the gunwale of a boat. A fishing rod handle at 2 includes a collar at 3 on the handle and engageable with a reel mounting plate 4 attaching a reel 5 to the handle.

The present rod holder includes an elongate tubular member 7 having a closed end 8 and an open end at 9. Mounting means at 10 include a bracket 11 for attachment to support structure such as a boat gunwale.

A first set of lengthwise edges at 14 and 15 define a first open area at 16 in communication with open end 9 of the tubular member. Edges 14 and 15 merge with additional or second set of edges at 17 and 18 in a contiguous manner. Edges 17 and 18 have a rotational component about the axis of A of member 7 and preferably are of a helical nature. A third set of edges at 20 and 21 define a third open area 22. The reel mounting plate 4 is received in open area 22 which is rotationally offset, about major axis A of the holder, from first open area 16.

As shown in FIG. 1, reel 5 will be retained in a downward or depending position by gravity and in such a position prevents extraction of the rod handle from the holder. Intentional removal of the rod handle entails rotational as well as axial movement of the handle. Closure 8 supports the end of the rod handle in place.

In FIG. 3 the lower portion of a modified mounting means is indicated at 10' and includes a cylindrical base at 23 which simulates a handle of a fishing rod to permit installation, permanently or temporarily, of the present fishing rod holder in a previously installed prior art rod holder shown in phantom lines at 24 in instances where such equipment is already in place on a boat, dock, etc.

The present invention is particularly suited for supporting a fly rod in place which typically has a reel attached between the gripped portion of the rod handle and the butt of the handle. Use of the present rod holder with other types of rods and reels may entail dimensional changes in the holder from that form of the invention shown.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A fishing rod and reel holder for attachment to a support and comprising,
    an elongate tubular member open at one end to receive the handle and fishing reel thereon and including wall structure having a first set of edges extending lengthwise of the tubular member and defining a first elongate open area and a second set of edges also extending lengthwise of the tubular member and defining a second elongate open area, said first elongate open area and said second elongate open area extending in an axial direction along the tubular member and rotationally offset frown one another about the major axis of the tubular member, said wall structure having a third set of edges defining a third open area in communication with said first and second open areas and through which a portion of the reel may pass, and
    mounting means for attaching said tubular member to a support.

2. The holder claimed in claim 1 wherein said first and second elongate open areas and the first and second sets of edges defining said areas are rotationally offset less than 180 degrees about said axis.

3. The holder claimed in claim 1 wherein said third edges are substantially helical.

4. The holder claimed in claim 1 wherein said first open area lies in a plane normal to a vertical plane containing the major axis of said tubular member.

5. The holder claimed in claim 1 wherein said tubular member includes an end closure.

6. The holder claimed in claim 1 wherein said mounting means comprises a cylindrical base for installation in a rod holder attachable to said support.

7. A fishing rod and reel holder for reception of a rod handle and reel and for attachment to a support and comprising, an elongate tubular member open at one end to receive the handle of a fishing rod and a reel thereon and including wall structure having lengthwise extending edges defining an open area in communication with said one end of the tubular member, additional edges defining an addtional open area and contiguous with the first mentioned edges and having a helical component whereby a fishing rod and reel must be moved axially and rotationally to insert the rod handle in the holder.

* * * * *